(12) United States Patent
Nielsen et al.

(10) Patent No.: US 8,386,178 B2
(45) Date of Patent: Feb. 26, 2013

(54) MARKING SYSTEM AND METHOD

(75) Inventors: Steven E. Nielsen, North Palm Beach, FL (US); Curtis Chambers, Palm Beach Gardens, FL (US); Jeffrey Farr, Jupiter, FL (US); Rene A. Vazquez, Herndon, VA (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 722 days.

(21) Appl. No.: 12/236,688

(22) Filed: Sep. 24, 2008

(65) Prior Publication Data

US 2009/0013928 A1    Jan. 15, 2009

Related U.S. Application Data

(63) Continuation of application No. 11/696,606, filed on Apr. 4, 2007, now Pat. No. 8,060,304.

(51) Int. Cl.
*G01C 21/00* (2006.01)

(52) U.S. Cl. ......... 701/521; 701/540; 427/137; 340/988

(58) Field of Classification Search .................. 427/137; 340/988; 701/213, 214, 521, 540
See application file for complete search history.

(56) References Cited

U.S. PATENT DOCUMENTS

| | | | |
|---|---|---|---|
| 3,871,557 A | 3/1975 | Smrt | |
| 3,972,038 A | 7/1976 | Fletcher et al. | |
| 3,974,491 A | 8/1976 | Sipe | |
| 3,988,922 A | 11/1976 | Clark et al. | |
| 4,258,320 A | 3/1981 | Schonstedt | |
| 4,387,340 A | 6/1983 | Peterman | |
| 4,388,592 A | 6/1983 | Schonstedt | |
| 4,520,317 A | 5/1985 | Peterman | |
| 4,536,710 A | 8/1985 | Dunham | |
| 4,539,522 A | 9/1985 | Schonstedt | |
| 4,590,425 A | 5/1986 | Schonstedt | |
| 4,623,282 A | 11/1986 | Allen | |
| 4,639,674 A | 1/1987 | Rippingale | |
| 4,712,094 A | 12/1987 | Bolson, Sr. | |
| 4,747,207 A | 5/1988 | Schonstedt et al. | |
| 4,803,773 A | 2/1989 | Schonstedt | |
| 4,818,944 A | 4/1989 | Rippingale | |
| 4,839,623 A | 6/1989 | Schonstedt et al. | |
| 4,839,624 A | 6/1989 | Schonstedt | |
| 4,873,533 A | 10/1989 | Oike | |
| 4,899,293 A | 2/1990 | Dawson et al. | |

(Continued)

FOREIGN PATENT DOCUMENTS

| | | |
|---|---|---|
| CA | 2623761 | 10/2008 |
| CA | 2623466 | 6/2011 |

(Continued)

OTHER PUBLICATIONS

Co-pending U.S. Appl. No. 12/539,497, filed Aug. 11, 2009.

(Continued)

*Primary Examiner* — Mark Hellner
(74) *Attorney, Agent, or Firm* — Foley & Lardner LLP; Joseph Teja, Jr.

(57) ABSTRACT

A marking tool and a method for marking a presence or an absence of at least one underground facility is presented. The method includes dispensing a marker when a trigger of a marking tool is actuated. The method further includes identifying at least one characteristic associated with the marker or the dispensing of the marker. The method further includes storing the at least one characteristic associated with dispensing the marker when the actuation of the trigger is signaled.

34 Claims, 8 Drawing Sheets

U.S. PATENT DOCUMENTS

| | | | |
|---|---|---|---|
| 4,989,151 A | 1/1991 | Nuimura | |
| 5,001,430 A | 3/1991 | Peterman et al. | |
| 5,006,806 A | 4/1991 | Rippingale et al. | |
| 5,014,008 A | 5/1991 | Flowerdew | |
| 5,017,873 A | 5/1991 | Rippingale et al. | |
| 5,025,150 A | 6/1991 | Oldham et al. | |
| 5,043,666 A | 8/1991 | Tavernetti et al. | |
| 5,045,368 A | 9/1991 | Cosman et al. | |
| 5,065,098 A | 11/1991 | Salsman et al. | |
| 5,093,622 A | 3/1992 | Balkman | |
| 5,097,211 A | 3/1992 | Schonstedt | |
| 5,114,517 A | 5/1992 | Rippingale et al. | |
| 5,122,750 A | 6/1992 | Rippingale et al. | |
| 5,136,245 A | 8/1992 | Schonstedt | |
| 5,138,761 A | 8/1992 | Schonstedt | |
| 5,150,295 A | 9/1992 | Mattingly | |
| 5,173,139 A | 12/1992 | Rippingale et al. | |
| 5,206,065 A | 4/1993 | Rippingale et al. | |
| 5,214,757 A | 5/1993 | Mauney et al. | |
| 5,231,355 A | 7/1993 | Rider et al. | |
| 5,239,290 A | 8/1993 | Schonstedt | |
| 5,260,659 A | 11/1993 | Flowerdew et al. | |
| 5,264,795 A | 11/1993 | Rider | |
| 5,299,300 A | 3/1994 | Femal | |
| 5,329,464 A | 7/1994 | Sumic et al. | |
| 5,361,029 A | 11/1994 | Rider et al. | |
| 5,365,163 A | 11/1994 | Satterwhite et al. | |
| 5,373,298 A | 12/1994 | Karouby | |
| 5,381,338 A | 1/1995 | Wysocki | |
| 5,430,379 A | 7/1995 | Parkinson et al. | |
| 5,444,364 A | 8/1995 | Satterwhite et al. | |
| 5,467,271 A | 11/1995 | Abel et al. | |
| 5,471,143 A | 11/1995 | Doany | |
| 5,486,067 A | 1/1996 | Huynh | |
| 5,517,419 A | 5/1996 | Lanckton | |
| 5,519,329 A | 5/1996 | Satterwhite | |
| 5,529,433 A | 6/1996 | Huynh | |
| 5,530,357 A | 6/1996 | Cosman et al. | |
| 5,543,931 A | 8/1996 | Lee et al. | |
| 5,553,407 A | 9/1996 | Stump | |
| 5,568,162 A | 10/1996 | Samsel et al. | |
| 5,576,973 A | 11/1996 | Haddy | |
| 5,621,325 A | 4/1997 | Draper et al. | |
| 5,629,626 A | 5/1997 | Russell et al. | |
| 5,644,237 A | 7/1997 | Eslambolchi et al. | |
| 5,659,985 A | 8/1997 | Stump | |
| 5,673,050 A | 9/1997 | Moussally et al. | |
| 5,689,415 A | 11/1997 | Calotychos et al. | |
| 5,699,244 A | 12/1997 | Clark, Jr. | |
| 5,704,142 A | 1/1998 | Stump | |
| 5,739,785 A | 4/1998 | Allison et al. | |
| 5,751,289 A | 5/1998 | Myers | |
| 5,751,450 A | 5/1998 | Robinson | |
| 5,764,127 A | 6/1998 | Hore et al. | |
| 5,769,370 A | 6/1998 | Ashjaee | |
| 5,819,859 A | 10/1998 | Stump et al. | |
| 5,828,219 A | 10/1998 | Hanlon et al. | |
| 5,848,373 A | 12/1998 | Delorme et al. | |
| 5,916,300 A | 6/1999 | Kirk et al. | |
| 5,917,325 A | 6/1999 | Smith | |
| 5,918,565 A | 7/1999 | Casas | |
| 5,920,194 A | 7/1999 | Lewis et al. | |
| 5,955,667 A | 9/1999 | Fyfe | |
| 6,026,135 A | 2/2000 | McFee et al. | |
| 6,031,454 A | 2/2000 | Lovejoy et al. | |
| 6,032,530 A | 3/2000 | Hock | |
| 6,037,010 A | 3/2000 | Kahmann et al. | |
| 6,053,260 A | 4/2000 | Boon | |
| 6,061,632 A | 5/2000 | Dreier | |
| 6,064,940 A | 5/2000 | Rodgers | |
| 6,074,693 A | 6/2000 | Manning | |
| 6,095,081 A | 8/2000 | Gochenour | |
| 6,107,801 A | 8/2000 | Hopwood | |
| 6,119,376 A | 9/2000 | Stump | |
| 6,127,827 A | 10/2000 | Lewis | |
| 6,130,539 A | 10/2000 | Polak | |
| 6,138,906 A | 10/2000 | DeMayo | |
| 6,140,819 A | 10/2000 | Peterman et al. | |
| 6,169,958 B1 | 1/2001 | Nagasamy et al. | |
| 6,188,392 B1 | 2/2001 | O'Connor et al. | |
| 6,188,777 B1 | 2/2001 | Darrell et al. | |
| 6,206,282 B1 | 3/2001 | Hayes, Sr. et al. | |
| 6,234,218 B1 | 5/2001 | Boers | |
| 6,240,360 B1 | 5/2001 | Phelan | |
| 6,268,731 B1 | 7/2001 | Hopwood et al. | |
| 6,282,477 B1 | 8/2001 | Gudat et al. | |
| 6,285,911 B1 | 9/2001 | Watts et al. | |
| 6,292,108 B1 | 9/2001 | Straser et al. | |
| 6,294,022 B1 | 9/2001 | Eslambolchi et al. | |
| 6,297,736 B1 | 10/2001 | Lewis et al. | |
| 6,299,934 B1 * | 10/2001 | Manning | 427/137 |
| 6,308,565 B1 | 10/2001 | French et al. | |
| 6,320,518 B2 | 11/2001 | Saeki et al. | |
| RE37,574 E | 3/2002 | Rawlins | |
| 6,356,082 B1 | 3/2002 | Alkire et al. | |
| 6,363,320 B1 | 3/2002 | Chou | |
| 6,375,038 B1 | 4/2002 | Daansen et al. | |
| 6,378,220 B1 | 4/2002 | Baioff et al. | |
| 6,388,629 B1 | 5/2002 | Albats et al. | |
| 6,390,336 B1 | 5/2002 | Orozco | |
| 6,401,051 B1 | 6/2002 | Merriam | |
| 6,407,550 B1 | 6/2002 | Parakulam et al. | |
| 6,411,094 B1 | 6/2002 | Gard et al. | |
| 6,437,708 B1 * | 8/2002 | Brouwer | 340/988 |
| 6,438,239 B1 | 8/2002 | Kuechen | |
| 6,459,266 B1 | 10/2002 | Fling | |
| 6,476,708 B1 | 11/2002 | Johnson | |
| 6,490,524 B1 | 12/2002 | White et al. | |
| 6,512,478 B1 | 1/2003 | Chien | |
| 6,526,400 B1 | 2/2003 | Takata | |
| 6,549,011 B2 | 4/2003 | Flatt | |
| 6,552,548 B1 | 4/2003 | Lewis et al. | |
| 6,585,133 B1 | 7/2003 | Brouwer | |
| 6,600,420 B2 | 7/2003 | Goff et al. | |
| 6,617,856 B1 | 9/2003 | Royle et al. | |
| 6,633,163 B2 | 10/2003 | Fling | |
| 6,650,293 B1 | 11/2003 | Eslambolchi | |
| 6,650,798 B2 | 11/2003 | Russell et al. | |
| 6,658,148 B1 | 12/2003 | Fung | |
| 6,674,276 B2 | 1/2004 | Morgan et al. | |
| 6,700,526 B2 | 3/2004 | Witten | |
| 6,710,741 B2 | 3/2004 | Tucker | |
| 6,717,392 B2 | 4/2004 | Pearson | |
| 6,723,375 B2 | 4/2004 | Zeck et al. | |
| 6,728,662 B2 | 4/2004 | Frost et al. | |
| 6,751,552 B1 | 6/2004 | Minelli | |
| 6,751,553 B2 | 6/2004 | Young | |
| 6,751,554 B1 | 6/2004 | Asher et al. | |
| 6,777,923 B2 | 8/2004 | Pearson | |
| 6,778,128 B2 | 8/2004 | Tucker et al. | |
| 6,798,379 B2 | 9/2004 | Tucker et al. | |
| 6,799,116 B2 | 9/2004 | Robbins | |
| 6,815,953 B1 | 11/2004 | Bigelow | |
| 6,819,109 B2 | 11/2004 | Sowers et al. | |
| 6,825,775 B2 | 11/2004 | Fling et al. | |
| 6,825,793 B2 | 11/2004 | Taylor, Jr. et al. | |
| 6,833,795 B1 | 12/2004 | Johnson et al. | |
| 6,833,811 B2 | 12/2004 | Zeitfuss et al. | |
| 6,836,231 B2 | 12/2004 | Pearson | |
| 6,845,171 B2 | 1/2005 | Shum et al. | |
| 6,850,161 B1 | 2/2005 | Elliott et al. | |
| 6,850,843 B2 | 2/2005 | Smith et al. | |
| 6,853,303 B2 | 2/2005 | Chen et al. | |
| 6,865,484 B2 | 3/2005 | Miyasaka et al. | |
| 6,898,525 B1 | 5/2005 | Minelli | |
| 6,898,550 B1 | 5/2005 | Blackadar et al. | |
| 6,904,361 B1 | 6/2005 | Tallman et al. | |
| 6,941,890 B1 | 9/2005 | Cristo et al. | |
| 6,947,028 B2 | 9/2005 | Shkolnikov | |
| 6,954,071 B2 | 10/2005 | Flatt et al. | |
| 6,956,524 B2 | 10/2005 | Tucker et al. | |
| 6,956,564 B1 | 10/2005 | Williams | |
| 6,958,690 B1 | 10/2005 | Asher et al. | |
| 6,968,296 B2 | 11/2005 | Royle | |
| 6,972,698 B2 | 12/2005 | Deguchi | |
| 6,975,942 B2 | 12/2005 | Young et al. | |
| 6,977,508 B2 | 12/2005 | Pearson et al. | |

| Patent Number | Date | Inventor(s) | Publication Number | Date | Inventor(s) |
|---|---|---|---|---|---|
| 6,992,584 B2 | 1/2006 | Dooley et al. | 2005/0040222 A1 | 2/2005 | Robinson |
| 6,993,088 B2 | 1/2006 | Fling et al. | 2005/0054457 A1 | 3/2005 | Eyestone et al. |
| 6,999,021 B2 | 2/2006 | Taylor, Jr. | 2005/0055142 A1 | 3/2005 | McMurtry et al. |
| 7,009,399 B2 | 3/2006 | Olsson et al. | 2005/0057745 A1 | 3/2005 | Bontje |
| 7,009,519 B2 | 3/2006 | Leonard et al. | 2005/0150399 A1 | 7/2005 | Wiley |
| 7,038,454 B2 | 5/2006 | Gard et al. | 2005/0156600 A1 | 7/2005 | Olsson |
| 7,042,358 B2 | 5/2006 | Moore | 2005/0192727 A1 | 9/2005 | Shostak et al. |
| 7,053,789 B2 | 5/2006 | Fling et al. | 2005/0206562 A1 | 9/2005 | Willson et al. |
| 7,057,383 B2 | 6/2006 | Schlapp et al. | 2005/0232475 A1 | 10/2005 | Floeder |
| 7,062,414 B2 | 6/2006 | Waite et al. | 2005/0278371 A1 | 12/2005 | Funk et al. |
| 7,079,591 B2 | 7/2006 | Fling et al. | 2006/0026020 A1 | 2/2006 | Waite et al. |
| 7,091,872 B1 | 8/2006 | Bigelow et al. | 2006/0055584 A1 | 3/2006 | Waite et al. |
| 7,113,124 B2 | 9/2006 | Waite | 2006/0077095 A1 | 4/2006 | Tucker et al. |
| 7,116,244 B2 | 10/2006 | Fling et al. | 2006/0085133 A1 | 4/2006 | Young |
| 7,120,564 B2 | 10/2006 | Pacey | 2006/0085396 A1 | 4/2006 | Evans |
| 7,235,980 B2 | 6/2007 | Pearson et al. | 2006/0109131 A1 | 5/2006 | Sen et al. |
| 7,285,958 B2 | 10/2007 | Overby et al. | 2006/0169776 A1 | 8/2006 | Hornbaker |
| 7,304,480 B1 | 12/2007 | Pearson | 2006/0220955 A1 | 10/2006 | Hamilton |
| 7,310,584 B2 | 12/2007 | Royle | 2006/0244454 A1 | 11/2006 | Gard et al. |
| 7,319,387 B2 | 1/2008 | Willson et al. | 2006/0254820 A1 | 11/2006 | Cole et al. |
| 7,331,340 B2 | 2/2008 | Barney | 2006/0262963 A1 | 11/2006 | Navulur |
| 7,336,078 B1 | 2/2008 | Merewether et al. | 2006/0276198 A1 | 12/2006 | Michelon et al. |
| 7,339,379 B2 | 3/2008 | Thompson et al. | 2006/0276985 A1 | 12/2006 | Xu |
| 7,342,537 B2 | 3/2008 | Pearson et al. | 2006/0282191 A1 | 12/2006 | Gotfried |
| 7,356,421 B2 | 4/2008 | Gudmundsson et al. | 2006/0282280 A1 | 12/2006 | Stotz et al. |
| 7,358,738 B2 | 4/2008 | Overby et al. | 2006/0285913 A1 | 12/2006 | Koptis |
| 7,372,247 B1 | 5/2008 | Giusti et al. | 2006/0287900 A1 | 12/2006 | Fiore et al. |
| 7,372,276 B2 | 5/2008 | Mulcahey | 2006/0289679 A1 | 12/2006 | Johnson et al. |
| 7,396,177 B2 | 7/2008 | Lapstun et al. | 2007/0013379 A1 | 1/2007 | Staples et al. |
| 7,396,178 B2 | 7/2008 | Lapstun et al. | 2007/0018632 A1 | 1/2007 | Royle |
| 7,400,976 B2 | 7/2008 | Young et al. | 2007/0031042 A1 | 2/2007 | Simental |
| 7,403,012 B2 | 7/2008 | Worsley et al. | 2007/0040558 A1 | 2/2007 | Overby et al. |
| 7,413,363 B2 | 8/2008 | Lapstun et al. | 2007/0100496 A1 | 5/2007 | Forell |
| 7,443,154 B1 | 10/2008 | Merewether et al. | 2007/0219722 A1 | 9/2007 | Sawyer et al. |
| 7,451,721 B1 | 11/2008 | Garza et al. | 2007/0223803 A1 | 9/2007 | Shindo |
| 7,482,973 B2 | 1/2009 | Tucker et al. | 2007/0268110 A1 | 11/2007 | Little |
| 7,500,583 B1 | 3/2009 | Cox | 2007/0286021 A1 | 12/2007 | Hoenmans et al. |
| 7,532,127 B2 | 5/2009 | Holman et al. | 2007/0288195 A1 | 12/2007 | Waite et al. |
| 7,636,901 B2 | 12/2009 | Munson | 2008/0010009 A1 | 1/2008 | Miyoshi |
| 7,640,105 B2 | 12/2009 | Nielsen et al. | 2008/0013940 A1 | 1/2008 | Jung |
| 7,664,530 B2 | 2/2010 | Skelton | 2008/0125942 A1 | 5/2008 | Tucker et al. |
| 7,733,077 B1 | 6/2010 | Merewether et al. | 2008/0180322 A1 | 7/2008 | Islam |
| 7,773,095 B1 | 8/2010 | Badrak et al. | 2008/0204322 A1 | 8/2008 | Oswald et al. |
| 7,834,801 B2 | 11/2010 | Waite et al. | 2008/0208415 A1 | 8/2008 | Vik |
| 7,834,806 B2 | 11/2010 | Tucker et al. | 2008/0228294 A1 | 9/2008 | Nielsen et al. |
| 7,889,888 B2 | 2/2011 | Deardorr | 2008/0245299 A1 | 10/2008 | Nielsen et al. |
| 7,929,981 B2 | 4/2011 | Sangberg | 2008/0255795 A1 | 10/2008 | Shkolnikov |
| 7,978,129 B2 | 7/2011 | Sawyer et al. | 2008/0310721 A1 | 12/2008 | Yang |
| 8,081,112 B2 | 12/2011 | Tucker et al. | 2009/0004410 A1 | 1/2009 | Thomson et al. |
| 8,106,660 B1 | 1/2012 | Merewether et al. | 2009/0063258 A1 | 3/2009 | Mueller et al. |
| 8,118,192 B2 | 2/2012 | Daugherty | 2009/0085568 A1 | 4/2009 | Cole |
| 8,144,245 B2 | 3/2012 | Vik | 2009/0109081 A1 | 4/2009 | Ryerson |
| 2001/0029996 A1 | 10/2001 | Robinson | 2009/0121933 A1 | 5/2009 | Tucker et al. |
| 2002/0035432 A1 | 3/2002 | Kubica et al. | 2009/0171616 A1 | 7/2009 | Zhang et al. |
| 2002/0053608 A1 | 5/2002 | Zeck et al. | 2009/0185858 A1 | 7/2009 | Malit |
| 2002/0103625 A1 | 8/2002 | Card et al. | 2009/0201178 A1 | 8/2009 | Nielsen et al. |
| 2002/0115472 A1 | 8/2002 | Andress | 2009/0201311 A1 | 8/2009 | Nielsen et al. |
| 2002/0122000 A1 | 9/2002 | Bradley et al. | 2009/0202101 A1 | 8/2009 | Nielsen et al. |
| 2002/0130806 A1 | 9/2002 | Taylor et al. | 2009/0202110 A1 | 8/2009 | Nielsen et al. |
| 2002/0130906 A1 | 9/2002 | Miyaki | 2009/0202111 A1 | 8/2009 | Nielsen et al. |
| 2003/0012411 A1 | 1/2003 | Sjostrom et al. | 2009/0202112 A1 | 8/2009 | Nielsen et al. |
| 2003/0080897 A1 | 5/2003 | Tranchina | 2009/0204238 A1 | 8/2009 | Nielsen et al. |
| 2003/0100316 A1 | 5/2003 | Odamura | 2009/0204466 A1 | 8/2009 | Nielsen et al. |
| 2003/0135328 A1 | 7/2003 | Burns et al. | 2009/0204614 A1 | 8/2009 | Nielsen et al. |
| 2003/0168834 A1 | 9/2003 | Ulrich | 2009/0204625 A1 | 8/2009 | Nielsen et al. |
| 2003/0184300 A1 | 10/2003 | Bigelow | 2009/0207019 A1 | 8/2009 | Nielsen et al. |
| 2003/0196585 A1 | 10/2003 | McDonald et al. | 2009/0208642 A1 | 8/2009 | Nielsen et al. |
| 2004/0006425 A1 | 1/2004 | Wood | 2009/0210098 A1 | 8/2009 | Nielsen et al. |
| 2004/0051368 A1 | 3/2004 | Caputo | 2009/0210245 A1 | 8/2009 | Wold |
| 2004/0057795 A1 | 3/2004 | Mayfield et al. | 2009/0210284 A1 | 8/2009 | Nielsen et al. |
| 2004/0070535 A1 | 4/2004 | Olsson et al. | 2009/0210285 A1 | 8/2009 | Nielsen et al. |
| 2004/0124988 A1 | 7/2004 | Leonard et al. | 2009/0210297 A1 | 8/2009 | Nielsen et al. |
| 2004/0168358 A1 | 9/2004 | Stump | 2009/0210298 A1 | 8/2009 | Nielsen et al. |
| 2004/0210370 A1 | 10/2004 | Gudat | 2009/0237408 A1 | 9/2009 | Nielsen et al. |
| 2004/0220731 A1 | 11/2004 | Tucker et al. | 2009/0238414 A1 | 9/2009 | Nielsen et al. |
| 2004/0225444 A1 | 11/2004 | Young et al. | 2009/0238415 A1 | 9/2009 | Nielsen et al. |
| 2005/0023367 A1 | 2/2005 | Reighard | 2009/0238416 A1 | 9/2009 | Nielsen et al. |
| 2005/0034074 A1 | 2/2005 | Munson | 2009/0238417 A1 | 9/2009 | Nielsen et al. |
| 2005/0038825 A1 | 2/2005 | Tarabzouni | 2009/0241045 A1 | 9/2009 | Nielsen et al. |

| | | |
|---|---|---|
| 2009/0241046 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |

FOREIGN PATENT DOCUMENTS

| | | |
|---|---|---|
| CH | 695087 A5 | 12/2005 |
| EP | 0636393 | 2/1995 |
| EP | 1521331 A2 | 4/2005 |
| EP | 1852365 A1 | 11/2007 |
| EP | 1974638 | 10/2008 |
| GB | 2266863 | 11/1993 |
| JP | 10060865 | 3/1998 |
| JP | 2000501666 | 2/2000 |
| JP | 2002079167 | 3/2002 |
| WO | WO-9112119 | 8/1991 |
| WO | WO-9424554 A1 | 10/1994 |
| WO | WO9516827 | 6/1995 |
| WO | WO-9629572 | 9/1996 |
| WO | WO-9854600 A1 | 12/1998 |
| WO | WO-9854601 A1 | 12/1998 |
| WO | WO-9900679 A1 | 1/1999 |
| WO | WO0194016 | 12/2001 |
| WO | WO-0228541 | 4/2002 |
| WO | WO-2004100044 A1 | 11/2004 |
| WO | WO-2004102242 A1 | 11/2004 |
| WO | WO-2005052627 A2 | 6/2005 |
| WO | WO-2006015310 A3 | 2/2006 |
| WO | WO-2006136776 A1 | 12/2006 |
| WO | WO-2006136777 A1 | 12/2006 |
| WO | WO-2007067898 A2 | 6/2007 |

OTHER PUBLICATIONS

Co-Pending U.S. Appl. No. 12/568,087, filed Sep. 28, 2009.
Co-pending U.S. Appl. No. 12/607,843, filed Oct. 28, 2009.
Co-pending U.S. Appl. No. 12/622,768, filed Nov. 20, 2009.
Co-pending U.S. Appl. No. 12/639,041, filed Dec. 16, 2009.
Co-pending U.S. Appl. No. 12/639,373, filed Dec. 16, 2009.
International Search Report and Written Opinion, Application Serial No. PCT/US2008/55796, Oct. 14, 2008.
International Search Report and Written Opinion, Application Serial No. PCT/US2008/55798, Jul. 28, 2008.
International Search Report and Written Opinion, Application Serial No. PCT/US2009/005299, Dec. 12, 2009.
Notice of Allowance dated Nov. 6, 2009 from Co-Pending U.S. Appl. No. 11/685,602.
Office Action dated Nov. 18, 2009 from Co-Pending Canadian Application No. 2,623,466, filed Mar. 4, 2008.

Office Action dated Nov. 23, 2009 from Co-Pending Canadian Application No. 2,623,761, filed Mar. 4, 2008.
Office Action dated Sep. 17, 2009 from Co-Pending U.S. Appl. No. 11/685,602.
Carey, B., "Tracking Shoes," Chicago Tribune Online Edition, Jan. 29, 2007; pp. 1-3; http://www.chicagotribune.com/services/site/premium/access-registered.intercept.
Fox, G. et al., "GPS Provides Quick, Accurate Data for Underground Utility Location" (as featured in Apr. 2002 issue of Trenchless Technology, http://www.woolpert.com/asp/articles/GPS-Provides.asp, Sep. 14, 2007, pp. 1 and 2.
Trimble Navigation Limited, H-Star Technology Explained, www.trimble.com, pp. 1-9, 2005.
Co-pending U.S. Appl. No. 11/685,602, filed Mar. 13, 2007.
Co-pending U.S. Appl. No. 11/696,606, filed Apr. 4, 2007.
Co-pending U.S. Appl. No. 12/429,920, filed Apr. 24, 2009.
Co-pending U.S. Appl. No. 12/363,951, filed Feb. 2, 2009.
Co-pending U.S. Appl. No. 12/364,369, filed Feb. 2, 2009.
Co-pending U.S. Appl. No. 12/364,359, filed Feb. 2, 2009.
Co-pending U.S. Appl. No. 12/364,339, filed Feb. 2, 2009.
International Search Report and Written Opinion, Application Serial No. PCT/US2009/005348, Mar. 2, 2010.
International Search Report and Written Opinion, Application Serial No. PCT/US2009/005359, Feb. 8, 2010.
"New Identification Technology Raises Concerns Over Privacy," PBS Online NewsHour Report, Aug. 17, 2006, p. 1-5, http://www.pbs.org/newshour/bb/science/july-dec06/rfid_08-17.html.
Office Action mailed Apr. 28, 2009 from Co-Pending U.S. Appl. No. 11/685,602.
Bernold, L. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild02lPDF/b02059.pdf>. p. 4, col. 2, para 2.
European Search Report, Application No. 08743671.3, Nov. 16, 2011.
European Search Report, Application No. 08743673.9, Feb. 28, 2011.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2010/000389, Jun. 2, 2010.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.
International Search Report and Written Opinion, Application No. PCT/US2009/003957, Mar. 21, 2011.
International Search Report and Written Opinion, Application No. PCT/US2010/036029, Sep. 3, 2010.
International Search Report and Written Opinion, Application No. PCT/US2011/047807, Dec. 6, 2011.
Jung, H.G., Structure Analysis Based Parking Slot Marking Recognition for Semi-automatic Parking System, Springer-Verlag Berlin Heidelberg 2006, 10 pages.
Notice of Allowance dated Jan. 24, 2012 from U.S. Appl. No. 12/363,951.
Notice of Allowance dated Aug. 25, 2011 from U.S. Appl. No. 11/696,606.
Notice of Allowance dated Apr. 28, 2011 from U.S. Appl. No. 29/356,631.
Notice of Allowance dated Jan. 25, 2012 from Canadian Application No. 2,710,189.
Notice of Allowance dated Nov. 12, 2010 from U.S. Appl. No. 29/356,242.
Notice of Allowance dated Nov. 12, 2010 from U.S. Appl. No. 29/356,633.
Notice of Allowance dated Nov. 12, 2010 from U.S. Appl. No. 29/356,635.
Notice of Allowance dated Nov. 28, 2011 from Canadian Application No. 2,710,269.
Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Jun. 16, 2010 from Canadian Application No. 2,691,707.
Office Action dated Sep. 26, 2011 from Canadian Application No. 2,739,119.
Office Action dated Sep. 26, 2011 from Canadian Application No. 2,739,320.
Office Action dated Oct. 4, 2011 from U.S. Appl. No. 12/364,359.
Office Action dated Oct. 20, 2011 from U.S. Appl. No. 12/639,041.
Office Action dated Nov. 9, 2011 from U.S. Appl. No. 12/429,929.
Office Action dated Nov. 15, 2011 from Canadian Application No. 2,691,707.
Office Action dated Dec. 30, 2011 from U.S. Appl. No. 12/701,447.
Office Action dated Jul. 20, 2010 from U.S. Appl. No. 11/696,606.
Office Action dated Jul. 11, 2011 from Canadian Application No. 2713282.
Office Action dated Jun. 28, 2011 from Canadian Application No. 2710269.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 262376.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Virginia Underground utility marking standard, Mar. 2004, 20 pages.
Office Action dated Mar. 13, 2012 from U.S. Appl. No. 12/364,359.
Luczak, S., "Increasing Accuracy of Tilt Measurements," Engineering Mechanics, vol. 14, 2007, p. 143-154.
New Mexico's Recommended Marking Guidelines for Underground Utilities, May 2006, 8 pages.
Notice of Allowance dated May 2, 2012 from U.S. Appl. No. 12/429,929.
Notice of Allowance dated Jul. 12, 2012 from U.S. Appl. No. 12/539,497.
Office Action dated Mar. 20, 2012 from US. Appl. No. 12/764,164.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated May 1, 2012 from Australian Application No. 2009300362.
Office Action dated May 15, 2012 from U.S. Appl. No. 12/797,243.
Office Action dated May 16, 2012 from U.S. Appl. No. 12/364,369.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 13, 2012 from U.S. Appl. No. 12/639,373.
Office Action dated Jun. 18, 2012 from U.S. Appl. No. 12/701,468.
Office Action dated Jun. 18, 2012 from U.S. Appl. No. 12/701,496.
Office Action dated Jul. 2, 2012 from U.S. Appl. No. 12/797,262.
Office Action dated Jul. 12, 2012 from U.S. Appl. No. 12/571,411.
U.S. Appl. No. 12/429,947, filed Apr. 24, 2009, Nielsen et al.
U.S. Appl. No. 12/571,411, filed Sep. 30, 2009, Nielsen et al.
U.S. Appl. No. 12/571,408, filed Sep. 30, 2009, Nielsen et al.

U.S. Appl. No. 12/571,401, filed Sep. 30, 2009, Nielsen et al.
U.S. Appl. No. 12/701,496, filed Feb. 5, 2010, Nielsen et al.
U.S. Appl. No. 12/701,468, filed Feb. 5, 2010, Nielsen et al.
U.S. Appl. No. 12/703,958, filed Feb. 11, 2010, Nielsen et al.
U.S. Appl. No. 12/797,169, filed Jun. 9, 2010, Nielsen et al.
U.S. Appl. No. 12/797,202, filed Jun. 9, 2010, Nielsen et al.
U.S. Appl. No. 12/797,211, filed Jun. 9, 2010, Nielsen et al.
U.S. Appl. No. 12/797,227, filed Jun. 9, 2010, Nielsen et al.
U.S. Appl. No. 12/797,243, filed Jun. 9, 2010, Nielsen et al.
U.S. Appl. No. 12/797,262, filed Jun. 9, 2010, Nielsen et al.
U.S. Appl. No. 12/764,164, filed Apr. 21, 2010, Nielsen et al.
U.S. Appl. No. 12/855,977, filed Aug. 13, 2010, Nielsen et al.
U.S. Appl. No. 12/859,394, filed Aug. 19, 2010, Nielsen et al.
U.S. Appl. No. 12/786,929, filed May 25, 2010, Nielsen et al.
U.S. Appl. No. 12/854,370 filed Aug. 11, 2010, Nielsen et al.
U.S. Appl. No. 13/644,226, filed Oct. 3, 2012, Nielsen et al.
3M Dynatel, Brochure, 2006, 1-4.
3M Dynatel, Locating and Marking System, Brochure, 2007, 1-16.
Notice of Allowance dated Aug. 1, 2012 from U.S. Appl. No. 12/364,339.
Notice of Allowance dated Sep. 5, 2012 from U.S. Appl. No. 12/854,370.
Notice of Allowance dated Oct. 1, 2012 from U.S. Appl. No. 12/607,843.
Office Action dated Jul. 26, 2012 from U.S. Appl. No. 12/639,041.
Office Action dated Jul. 27, 2012 from European Application No. 08743671.3.
Office Action dated Aug. 15, 2012 from Australian Application No. 2010214104.
Office Action dated Aug. 29, 2012 from U.S. Appl. No. 12/701,447.
Office Action dated Sep. 4. 2012 from U.S. Appl. No. 12/622,768.
Office Action dated Sep. 21, 2012 from U.S. Appl. No. 12/797,202.
Office Action dated Oct. 15, 2012 from U.S. Appl. No. 12/797,227.
Office Action dated Oct. 19, 2012 from U.S. Appl. No. 12/797,243.
Olsson, Office Action dated Sep. 13, 2012 from U.S. Appl. No. 12/827,993.
Office Action dated Oct. 2, 2012 from Japanese Application No. 2010-502170.
Office Action dated Nov. 14, 2012 from Canadian Application No. 2,750,908.
Office Action dated Nov. 20, 2012 from U.S. Appl. No. 12/701,468.
Office Action dated Nov. 21, 2012 from U.S. Appl. No. 12/701,496.
Office Action dated Nov. 23, 2012 from U.S. Appl. No. 12/855,977.
Office Action dated Nov. 26, 2012 from U.S. Appl. No. 12/764,164.
Office Action dated Dec. 5, 2012 from U.S. Appl. No. 12/797,262.
Office Action dated Dec. 28, 2012 from U.S. Appl. No. 12/364,359.

* cited by examiner

| MARKER CHARACTERISTIC(S) 610 | TIMESTAMP 620 |
|---|---|
| (YELLOW PAINT) | (2005-10-30 10:45) |

ENTRY {

Figure 6A

MARKING SYSTEM AND METHOD

CROSS-REFERENCE TO RELATED APPLICATIONS

This patent application is a continuation of U.S. application Ser. No. 11/696,606, filed in the U.S. Patent and Trademark Office on Apr. 4, 2007 by Nielsen et al., the entire contents of which is being incorporated herein by reference in its entirety.

BACKGROUND

1. Technical Field

The present disclosure generally relates to a marking system, and more particularly, to a marking system for use in the marking of underground facilities.

2. Description of the Related Art

Excavators are required to notify underground facility owners in advance of their excavation activities and to describe and communicate the geographic area of those activities to underground facility owners. The geographic area so described is commonly referred to as "the dig area." In turn, facility owners (which, as used herein, may include owners, operators, and/or third party contractors that provide services to a facility owner as an agent or otherwise) are required to determine if they own or operate any underground facilities at an identified dig area. The presence or absence of underground facilities at a dig area is generally detected using a device commonly referred to as a "locate wand." Locate wands use a number of electronic methods to detect the presence or absence of underground facilities. The presence of those underground facilities, if any, which exist within a dig area is marked using paint or some other physical marking system, such as flags. Paint is generally applied as a sequence of dashes or dots on the surface (grass, dirt, asphalt, concrete, and the like) above the underground facility and is color-coded to indicate to the excavator the type (e.g., gas, water, sewer, power, telephone, cable television, and the like) of the underground facility present. Flags, which also may identify the underground facility using color-coding, can be placed in the ground above the underground facility being marked. Paint and/or flags can be dispensed using various devices. The application of paint, flags, or some other marking object to indicate the presence of an underground facility is called a "locate" or "locate operation". The marks, for example, paint or flags, resulting from a locate are commonly called underground facility "locate marks".

A marking tool is typically used to mark the ground, pavement, or other surfaces in order to provide a visual indication of the presence or absence of underground facilities. Paint is a commonly used marker and is typically applied using a paint marking tool. The color of the paint is generally chosen to correspond to the type of facility being marked (e.g., red color for a power line, and the like). A variety of markers, such as liquids, flags, and stakes are also used and different visual or other characteristics of the marker are used for representing and corresponding to different types of underground facilities. For example, the color, shape, or other characteristic of a flag marker can represent a particular type of underground facility (e.g., a square shaped flag for a power line, and the like).

If paint is used as the marker, a locate technician marks the presence or absence of an underground facility using a paint marking tool to spray paint on the ground above or near the facility. The paint marking tools commonly used have a paint canister holder that is adapted to hold a single aerosol can of paint in an axial orientation with respect to the long axis of the aerosol can. The paint marking tool is typically designed to enable a locate technician or user to walk or stand erect while dispensing the paint.

Upon locating the presence or absence of an underground facility, the locate technician will load a paint can of the appropriate color for the facility being marked into the paint marking tool. If a different type of facility needs to be marked, the locate technician must change the paint can to one of the appropriate color associated with the new facility being marked.

SUMMARY

According to one aspect of the present disclosure, a marking tool including a marker dispenser to hold and dispense a marker is provided. The marking tool further includes a processor to determine at least one characteristic associated with dispensing the marker.

According to another aspect of the present disclosure, a marking tool including a marker dispenser to hold and dispense a marker is provided. The marking tool further includes a processor to determine at least one characteristic associated with the marker.

According to another aspect of the present disclosure, a method for marking a presence or an absence of at least one underground facility is presented. The method includes dispensing a marker when a trigger of a marking tool is actuated and identifying at least one characteristic associated with dispensing the marker. The method further includes storing the at least one characteristic associated with dispensing the marker when the actuation of the trigger is signaled.

According to another aspect of the present disclosure, a method for marking a presence or an absence of at least one underground facility is presented. The method includes identifying at least one marker characteristic regarding a marker loaded into a marking tool. The method further includes dispensing the marker when a trigger of the marking tool is actuated, and storing the at least one marker characteristic when the actuation of the trigger is received.

According to an aspect of the present disclosure, a marking tool is presented. The marking tool includes a marker dispenser for dispensing a marker from a marker container, and a processor to receive information associated with dispensing the marker.

According to another aspect of the present disclosure, a marking tool is presented. The marking tool includes a marker dispenser for dispensing a marker from a marker container, and a tag associated with the marker container, the tag storing information associated with at least one characteristic of the marker or marker container. The marking tool further includes a tag reader for reading the information from the tag and a processor to receive the information from the tag reader.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

FIGS. 6A-6C are diagrams of exemplary entries that can be created and viewed in relation to the marking tool, according to the present disclosure.

DETAILED DESCRIPTION OF EXEMPLARY EMBODIMENTS

The following detailed description refers to the accompanying drawings. The same reference numbers in different drawings may identify the same or similar elements. In addition, the following detailed description does not limit the scope of the present disclosure.

Figure 1:
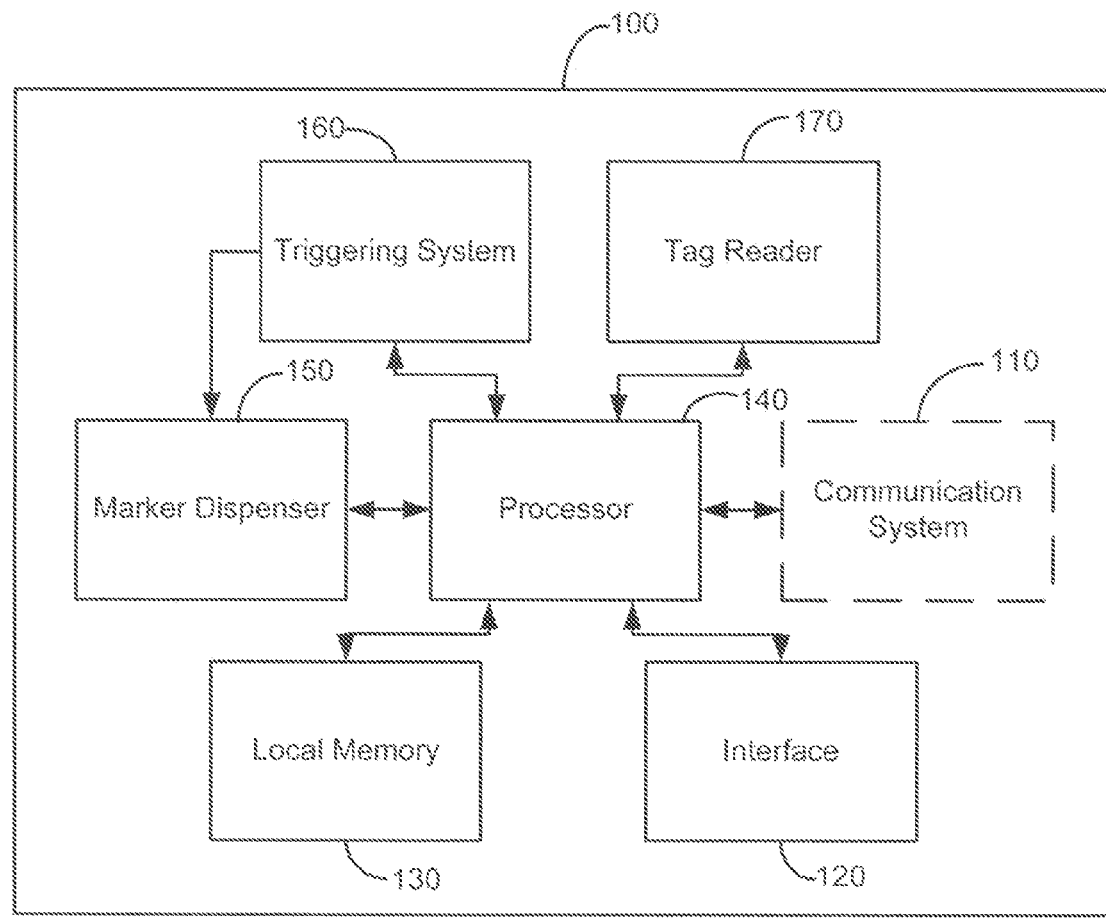
FIG. 1 is a block diagram of an exemplary marking system, according to the present disclosure.

With reference to FIG. 1, a block diagram of an exemplary marking system 100 is shown. System 100 may include a communication system 110, an interface 120, a local memory 130, a processor 140, a marker dispenser 150, a triggering system 160, and a tag reader 170. In other implementations, system 100 may include additional or different components.

System 100 may be used to dispense markers via marker dispenser 150. In one exemplary application of system 100, the markers may be used to mark underground facilities, such as telecommunications (e.g., telephone and/or cable), power, gas, water, or sewer. The marker that is used to mark underground facilities may include a liquid, such as paint or objects, such as flags, stakes, and the like.

A user may control the operation of system 100 via interface or user interface 120. In an implementation, interface 120 may include a touch screen interface that can provide various operational controls and status indicators of system 100, and can allow the user to navigate the controls by touching particular areas of the screen. In another implementation, interface 120 may include another form of input and/or output, such as, for example, a display for displaying information and a keypad for entering information. In either situation, interface 120 may provide operational controls to function as triggering system 160.

Triggering system 160 may trigger the dispensing of markers and the storing of marking information. The marking information, which will be described in more detail below, may include information regarding a characteristic of the marker(s) being dispensed, time data (e.g., time data can include, for example, a timestamp, date, and/or elapsed time information), and/or count data (e.g., a number of times that markers were dispensed). In another embodiment, marking information may include signals and information that are processed and recorded between trigger pulls and/or when the trigger is not actuated or at rest. In operation, a user may engage a triggering mechanism in triggering system 160 (explained in more detail below) in order to dispense the markers. When the triggering mechanism is engaged, triggering system 160 may also initiate storing of the marking information. Alternatively, when the triggering mechanism is not engaged, triggering system 160 may also initiate storing of the marking information. This may be done by sending a signal to processor 140, which may cause processor 140 to store the marking information in local memory 130. Alternatively, or additionally, processor 140 may store the marking information by transmitting the marking information for storage by a device or system external to system 100 (not shown in FIG. 1). In an implementation, marking information may be stored only when a marker is being dispensed by marker dispenser 150.

The marking information may be used by an external device and/or system to identify which markers were dispensed, when the markers were dispensed and/or an amount of markers or marking substance that were dispensed. The marking information may be useful to determine whether a user dispensed the correct marker(s) (e.g., the correct color paint) in a particular location. In addition, the marking information may be used to visually depict (e.g., in real time as the dispensing occurs) or reconstruct (e.g., at a later time after the dispensing is complete) the dispensing of the markers on an electronic representation of the area that is currently being marked or was previously marked. In addition, the marking information may be used to determine whether the job was completed correctly (e.g., that the amount of paint dispensed at the location was reasonable given the job that was to be performed at the location).

Marker dispenser 150 may hold the markers and may contain an actuation mechanism (not shown in FIG. 1) that causes the markers to be dispensed when triggering system 160 is activated. As described above, the markers dispensed by marker dispenser 150 may include a liquid (e.g., paint) or an object (e.g., flags or stakes). Details of marker dispenser 150 will be discussed in more detail below.

System 100 may also include a tag reader 170. In one implementation, tag reader 170 may include a device that can read tags, including the marking characteristics of the marker to which the tag is affixed. A "tag", as the term is used herein, may refer to any item that is capable of storing machine-readable information, such as a barcode, a radio frequency identification (RFID) device or a near field communication (NFC) device. A "tag reader" may refer to any device that can read the type of information stored on the particular tag. A tag may be passive, active, or any combination thereof. A passive tag may transmit data in response to signals received from tag reader 170. An active tag may continuously transmit data to tag reader 170. Tags can be attached to the containers that hold the markers that are loaded into marker dispenser 150 and can incorporate data that corresponds to one or more characteristics of the marker (e.g., paint color if the marker is paint). Other examples of marker characteristics include, but are not limited to, the type of marker and a shape of marker. Tag reader 170 may incorporate an antenna (not shown) to read the data from a tag (whether passive, active, or any combination thereof). The data read by tag reader 170 can then be sent to processor 140 for a determination of the corresponding characteristic. The corresponding characteristic can then be stored in local memory 130, displayed by interface 120, and/or transmitted external to system 100.

Communication system 110 may include an interconnection interface for transmitting data to and/or receiving data from one or more external devices and/or systems located either local to or remote from system 100. Communication system 110 may include, for example, a remote computing device or docking station. Wired interfaces may include, but are not limited to, USB ports, RS232 connectors, RJ45 connectors, Ethernet and any combination thereof. Wireless interfaces may include, but are not limited to, Internet, Bluetooth® technology, Wi-Fi, Wi-Max, IEEE 802.11 technology, Radio Frequency (RF), Local Area Networks (LAN), Wide Area Networks (WAN), Shared Wireless Access Protocol (SWAP), Infrared Data Association (IrDA) compatible protocols, and other types of wireless networking protocols, and combinations thereof.

In one implementation, communication system 110 may send marking information stored in local memory 130 to an external device or system and/or receive information from an external device or system. The marking information may be used by the external device or system to identify a marker dispensed by a user of system 100, identify a time at which the marker was dispensed, and/or determine an amount of the marker used at a particular location.

System 100, as broadly described herein, may be particularly suited for incorporation into marking tools for marking underground facilities. As discussed above, a marking tool is used to mark the ground, pavement, or other surfaces in order to provide a visual indication of the presence of underground facilities. The type of marker that may be used includes paint that may be supplied in aerosol canisters that are oriented axially with respect to the long axis of the aerosol canisters. The marking tool enables a user to walk or stand erect while dispensing the markers.

If system 100 is incorporated into a paint marking tool, a tag may be attached to the paint canisters to identify a characteristic of the paint, such as the color of the paint in the paint canister. Tag reader 170 can read this paint characteristic (e.g., the color information) from the tag when the paint canister is inserted into marker dispenser 150, and processor 140 can display the color information read by tag reader 170 on interface 120. Alternatively, or additionally, the color information may be provided to the user in other ways. For example, the color information may be audibly provided to the user (e.g., via a generated voice or a series of beeps or honks) through a speaker or other device known in the art. The color information may also, or alternatively, be provided to the user visually in a manner other than via interface 120. For example, the color information may be provided on an object worn or carried by the user (e.g., a pair of glasses, a bracelet, a ring, and the like) having display capabilities and/or being capable of changing color.

In one implementation, processor 140 can estimate how much paint of a particular color has been dispensed. Processor 140 could do this by maintaining a separate timer for each color. The timer for a particular color would increase its count every time the triggering mechanism is activated and that color is mounted in marker dispenser 150 (which can be determined by reading the tag on the paint canister using tag reader 170). This information can be useful for managing paint inventory or determining whether the amount of paint used at a particular location is reasonable given the job to be performed at that location.

A paint marking tool is just one possible application of system 100. System 100 can be applied to any marking system that uses markers that can be affixed with tags. Any marker characteristic that a user would find useful can be stored on the tag that is affixed to the marker.

Figure 2:
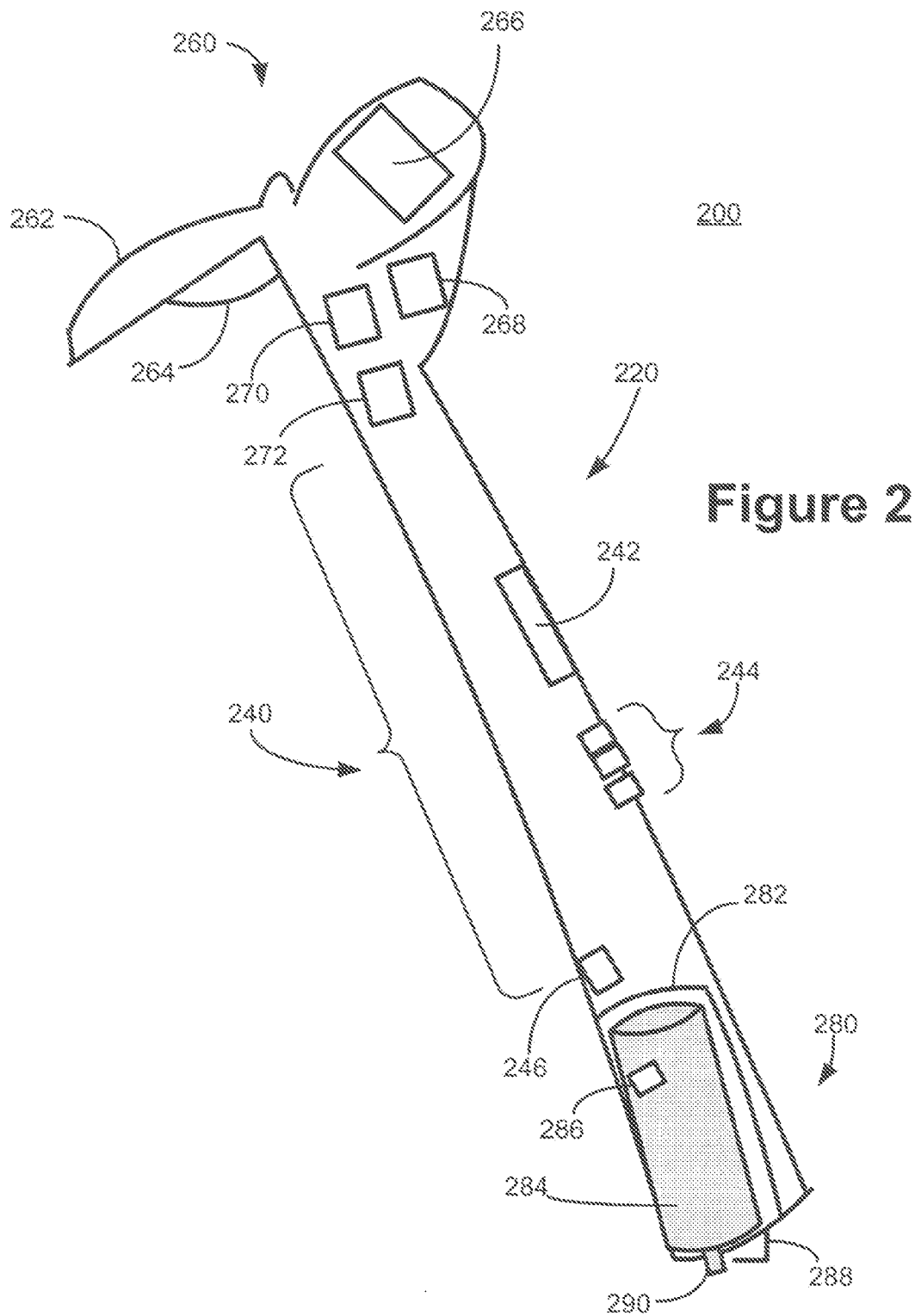
FIG. 2 is a diagram of an exemplary marking tool, according to the present disclosure.

Turning to FIG. 2, a diagram of an exemplary marking tool 200 is disclosed. For the description to follow, assume that marking tool 200 uses paint as the marker. However, it should be appreciated that any other marker, such as another type of liquid, flags, stakes, and the like, may be used in other implementations.

Marking tool 200 may include a housing 220 with an elongated center housing portion 240, a top housing portion 260, and a bottom housing portion 280. Housing 220 may be formed of any at least semi-rigid material, and may be formed of a lightweight material such as aluminum or plastic. The marking tool may be powered by rechargeable batteries, disposable batteries, power cords, and the like (not shown in FIG. 2).

A paint canister holder 282 may be attached to bottom housing portion 280. Paint canister holder 282 may include an open-ended tubular structure that is attached to bottom housing portion 280 by any suitable attachment mechanisms, such as rivets, adhesive, mechanical fasteners, or the like. Paint canister holder 282 may be formed of any material such as injection-molded plastic, formed sheet metal, or any other appropriate material that may be fabricated into an open tubular configuration or any other configuration that will serve to support a paint canister 284 with the paint canister axis parallel or substantially parallel to housing 220.

A tag reader 246, which may include a device that can read tags, may be mounted on or located within housing 220 or on paint canister holder 282. Tag reader 246 may incorporate an antenna (not shown) that is capable of transmitting and/or reading data from a tag. When a tag 286 is attached to a paint canister 284 that incorporates data that corresponds to characteristics of the paint (e.g., paint color), tag reader 246 may read that data. Other examples of marker characteristics include, but are not limited to, the type of marker and the shape of marker. The data read by tag reader 246 can then be sent to a processor 268 for a determination of the corresponding characteristic. The corresponding characteristic can then be provided to the user, stored in local memory 270, and/or transmitted external to marking tool 200.

As mentioned above, tag reader 246 may be mounted anywhere on or within housing 220 or on paint canister holder 282. However, tag reader 246 does not have to be mounted anywhere on marking tool 200 itself, rather it may be external to the marking tool 200. For example, tag reader 246 may be carried by a user. In general, tag reader 246 may be mounted or located at any location, as long as it can receive data transmitted from tag 286.

An actuation mechanism 288 may be attached to bottom housing portion 280 at a location from which it can actuate nozzle 290 of paint canister 284. The actuation mechanism, such as a mechanical actuation device 288, may include a rigid material that depresses nozzle 290 when actuated. However, any mechanism may be used to actuate the nozzle 290 of the paint canister 284.

A handle 262 may be provided at top housing portion 260. Handle 262 may be formed of injection-molded plastic or any other appropriate material, and may be attached to top housing portion 260 by rivets, adhesive, or any other suitable means. A mechanical trigger 264 may be provided on top housing portion 260. Mechanical trigger 264 may be located on handle 262 and attached using any suitable means. It is further contemplated that trigger 264 may be an electronic trigger, a wireless trigger, and/or a touch screen display.

Display 266 may be provided on top housing portion 260. Display 266 may include a touch-screen display for displaying information to a user, as well as acting as an input device. Processor 268 and local memory 270 are located in housing 220. In one implementation, processor 268 and local memory 270 may be located in top housing portion 260 so as to be in close proximity to display 266 and mechanical trigger 264. In another implementation, processor 268 and local memory 270 may be located elsewhere within housing 220.

A timer 272 may be provided on top housing portion 260. Timer 272 may include any device that can output time data to some level of accuracy (e.g., accuracy to the minute, the second, the millisecond, etc.). Timer 272 may output time data to the processor 268. In one implementation, timer 272 may be capable of generating the time data itself. In this situation, timer 272 may take the form of a clock. In another implementation, timer 272 may receive the time data from another device external to marking tool 200. In this situation, timer 272 may take the form of a receiver. In some situations, it may be beneficial for timer 272 to be synchronized to another timer (not shown), either situated at a separate location on marking tool 200 or located externally to marking tool 200.

A wireless communication antenna 242 may be located on housing 220, and used to transmit data, such as marking information stored in local memory 270, to an external device or system and/or to receive information from an external device/system. Marking tool 200 may also include one or more input/output ports 244, such as USB, SCSI, Firewire, Ethernet, and/or other ports, for interfacing with other equipment and/or computers.

In operation, a user operates marking tool 200 while standing or walking in an upright manner. A user may control the operation of marking tool 200 via display 266, a mechanical trigger 264, and/or a wireless or wired (hereinafter "wireless/wired") interface that may be provided via wireless communication antenna 242 and/or input/output ports 244.

The various operational controls and status indicators of marking tool 200 are displayed on display 266, and the user can also navigate the controls by touching particular areas of display 266. Although a touch-screen display is one form of display 266, any other type of display or interface may be used such as, for example, a display for displaying information and a keypad for entering information. As opposed to mechanical trigger 264, the user may use display 266 to trigger the dispensing of paint and the storing of marking information.

Mechanical trigger 264 may also trigger the dispensing of paint and the storing of marking information. In one implementation, marking tool 200 may store the marking information only when paint is being dispensed. This may be accomplished by using a mechanical trigger 264 that, when activated by the user, triggers both the actuation mechanism 288 for paint canister 284 and the storing of the marking information by processor 268.

Mechanical trigger 264 can trigger actuation mechanism 288 via a mechanical connection between mechanical trigger 264 and actuation mechanism 288. For example, actuation mechanism 288 can be a rigid material that is connected to mechanical trigger 264 via a mechanical linkage (not shown), in which case depressing mechanical trigger 264 may cause the actuation mechanism to apply pressure to nozzle 290 of paint canister 284. However, mechanical trigger 264 may also, or alternatively, trigger actuation mechanism 288 via an electronic connection. The electronic connection may be a hardwired connection or a wireless connection. If the connection between mechanical trigger 264 and actuation mechanism 288 is an electronic connection, actuation mechanism 288 may include a mechanism for generating the force necessary to depress nozzle 290 of paint canister 284.

The wireless/wired interface may be capable of capturing signals that reflect a user's intent. For example, the wireless/wired interface may include a microphone that can capture a user's intent by capturing the user's audible commands. Alternatively, the wireless/wired interface may interact with a device that monitors a condition of the user, such as eye movement, brain activity, pedometer, or heart rate. In either event, the wireless/wired interface may generate signals that may be sent to processor 268 for processing. Processor 268 may use the signals to trigger the dispensing of paint and the storing of marking information.

Figure 3:
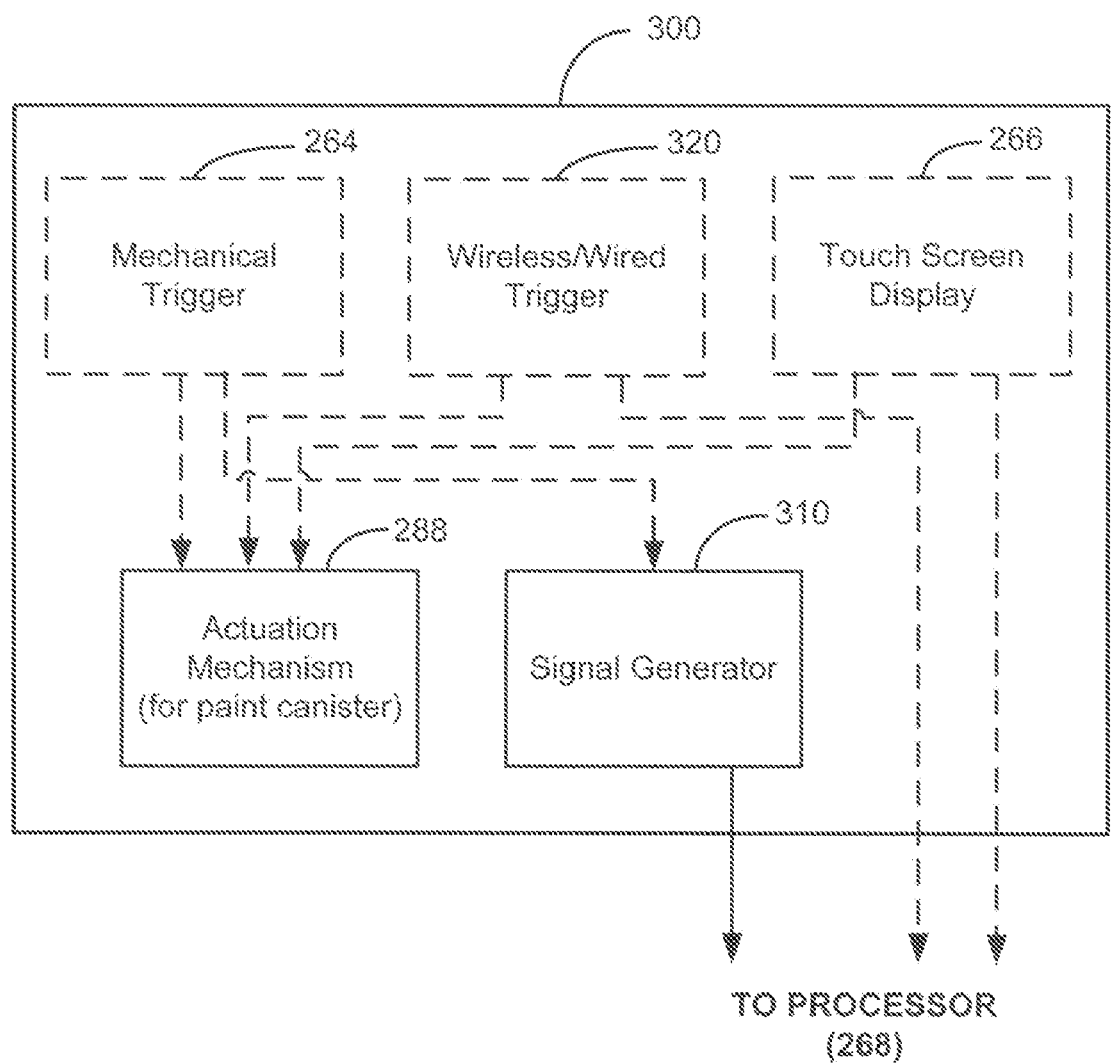
FIG. 3 is a diagram of an exemplary triggering system that may be used in the marking tool of FIG. 2, according to the present disclosure.

Referring now to FIG. 3, a diagram of one embodiment of a triggering system 300 that may be used in marking tool 200 of FIG. 2 is shown. As shown in FIG. 3, triggering system 300 may include an actuation mechanism such as mechanical trigger 264, a wireless/wired trigger 320, and/or a touch screen display 266, mechanical actuation device 288, and a signal generator 310.

In operation, a user may trigger the storing of the marking information and the dispensing of paint by activating mechanical trigger 264. The storing of the marking information and the dispensing of paint may also, or alternatively, be triggered by a trigger signal from wireless/wired trigger 320 or by choosing a command that is displayed on touch screen display 266. It should be appreciated that triggering system 300 may include a mechanical trigger 264, a trigger signal from wireless/wired trigger 320, a trigger command on a touch screen display 266, or a combination of a mechanical trigger 264, a trigger signal from wireless/wired trigger 320, and/or a trigger command on a touch screen display 266 for initiating the storing of the marking information and the dispensing of paint.

Upon actuation of mechanical trigger 264 by a user, the mechanical actuation device 288 and signal generator 310 are both activated. Mechanical actuation device 288 actuates nozzle 290 of paint canister 284, thus dispensing paint out of paint canister 284, as depicted in FIG. 2. Signal generator 310, when activated, sends a signal to processor 268 indicating that the mechanical trigger is being activated. As discussed above and depicted in FIG. 2, this signal could be used to trigger the storing of marking information and/or a timer for keeping track of how much paint of a particular color has been dispensed when a tag 286 that identifies the paint color is attached to paint canister 284 that is mounted in paint canister holder 282.

Mechanical trigger 264 can activate mechanical actuation device 288 via a mechanical connection (e.g., a mechanical linkage) between the mechanical trigger 264, and mechanical actuation device 288. In another embodiment, mechanical trigger 264 can activate mechanical actuation device 288 via a wired or wireless electronic connection between mechanical trigger 264 and mechanical actuation device 288.

If a trigger signal from wireless/wired trigger 320 is used by the user to initiate marking information storing and paint dispersal, wireless/wired trigger 320 may send a signal to both e mechanical actuation device 288 and processor 268. The signal sent to mechanical actuation device 288 by wireless/wired trigger 320 may result in the actuation of nozzle 290 of paint canister 284 by mechanical actuation device 288. The signal sent to processor 268 by wireless/wired trigger 320 may trigger the storing of the marking information. The signals sent by wireless/wired trigger 320 to mechanical actuation device 288 and processor 268 may be sent via a wired or wireless connection.

If a command on touch screen display 266 is used by the user to initiate storing of marking information and paint dispersal, touch screen display 266 can send a signal to both mechanical actuation device 288 and processor 268. The signal sent to mechanical actuation device 288 by touch screen display 266 may result in the actuation of nozzle 290 of paint canister 284 by mechanical actuation device 288. The signal sent to processor 268 by touch screen display 266 may trigger the storing of the marking information. The signals sent by touch screen display 266 to mechanical actuation device 288 and processor 268 may be sent via a wired or wireless connection.

Figure 4:
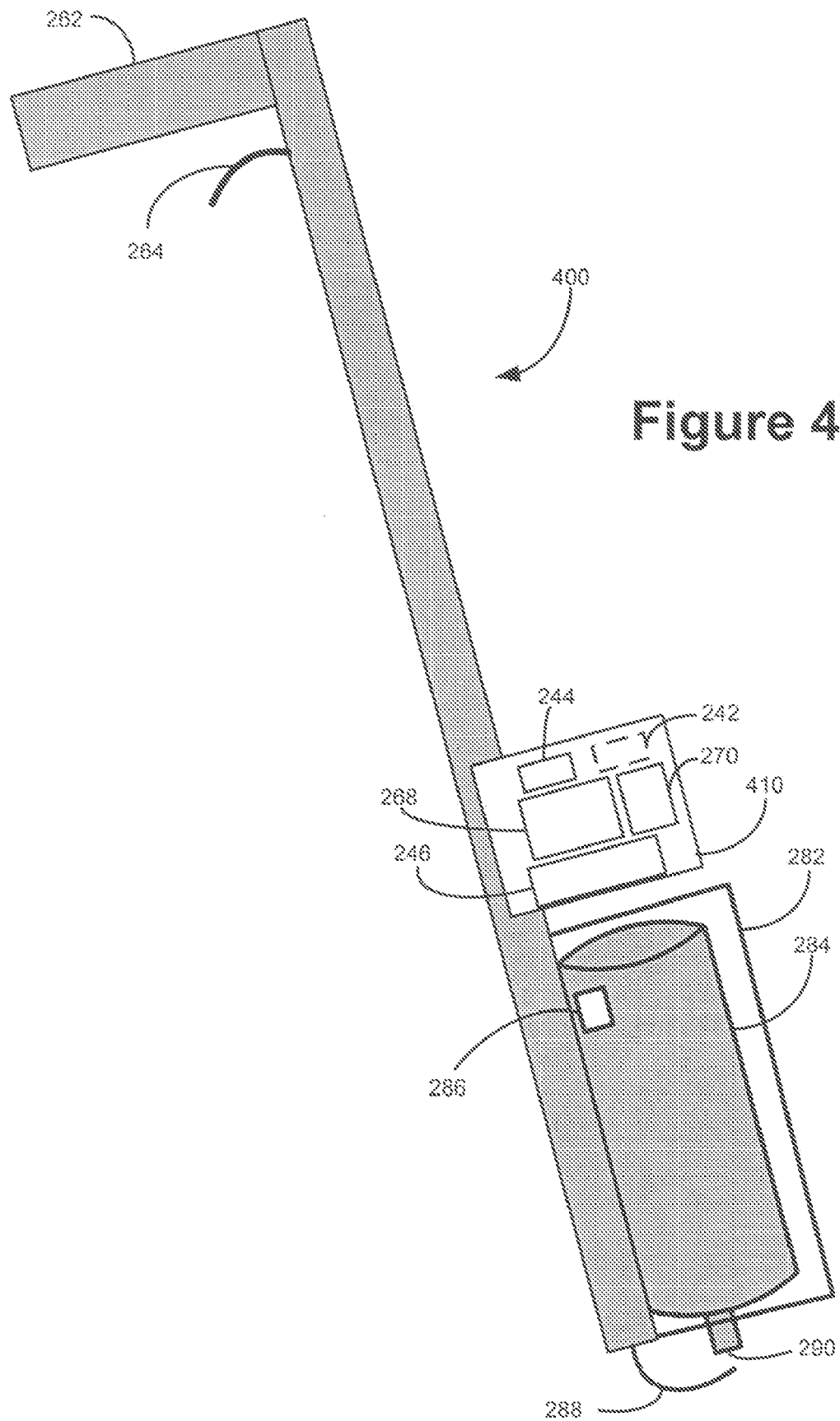
FIG. 4 is a diagram of another exemplary marking tool, according to the present disclosure.

As shown in FIG. 4, marking system 100 may be incorporated into already existing marking tools by incorporating the electronics of the marking system onto a board 410 that can then be mounted onto an existing marking tool 400. Processor 268, local memory 270, input/output ports 244, tag reader 246, and/or wireless communication antenna 242 may be mounted on board 410. Board 410 can be attached to marking tool 400 using any means, such as with fasteners, clamps, glue, etc.

Figure 5:
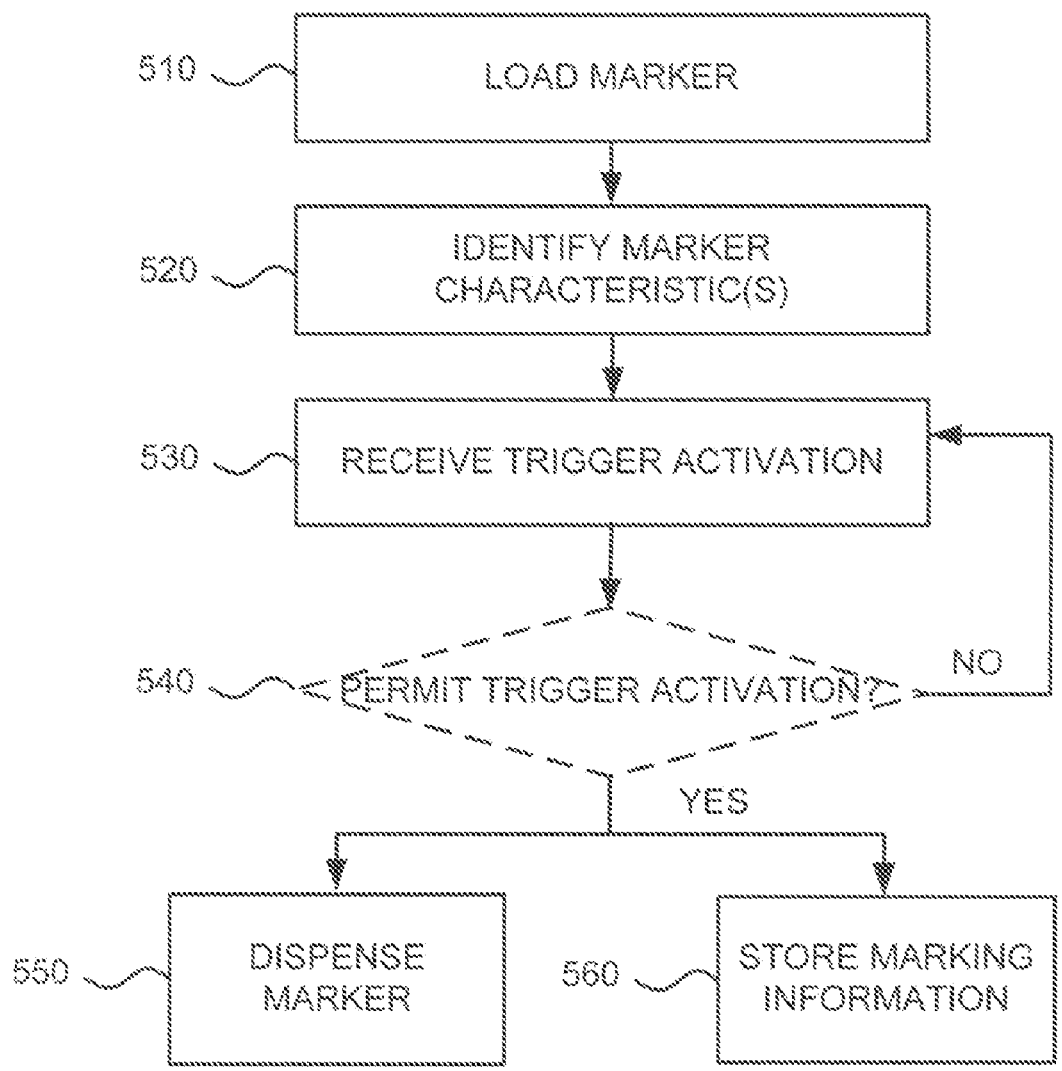
FIG. 5 is a flowchart of an exemplary process for marking an area, according to the present disclosure.

With reference to FIGS. 2, 4 and 5, a flowchart of an exemplary process for marking an area is disclosed. The process of FIG. 5 may begin with a user of a marking tool, such as marking tool 200 (FIG. 2), being dispatched to a location to be marked. The user might be given a ticket that identifies what facilities the user needs to mark at the location. The ticket might specify, for example, the location to be marked, the day and/or time that the location is to be marked, and/or whether the user is to mark the location for telecommunications (e.g., telephone and/or cable), power, gas, water, and/or sewer. The user might arrive at the location and take his/her marking tool out of his/her vehicle. In some situations, the user might load his/her pockets with extra markers (e.g., extra canisters of the same color of paint or different colors of paint).

A marker may be loaded into marking tool (block 510). For example, the user may load a paint canister 284 of the appropriate color into paint canister holder 282. If the user is going to mark power lines, for example, the user might load a paint canister 284 containing red paint. Paint canister 284 may be loaded such that nozzle 290 extends out of the bottom of marking tool 200, as illustrated in FIG. 2.

In one implementation, as described above, a tag 286 may be affixed to paint canister 284. Tag 286 may store information regarding one or more characteristics of the marker. For example, tag 286 may identify the type of marker (e.g., paint, flag, stake, and the like), the color of marker (e.g., orange, red, yellow, blue, or green, and the like), and/or the shape of the marker (e.g., square, triangular, circular, and the like).

The marker characteristic(s) may be identified (block 520). In one implementation, the marker characteristic(s) may be systematically determined. For example, data from tag 286 may be read by tag reader 246 and sent to processor 268. Processor 268 may determine the marker characteristic(s) from this data, and cause information regarding the marker characteristic(s) to be presented to the user (e.g., visually and/or audibly).

For example, a user interface may identify a characteristic of the marker. The user interface may optionally request the user to confirm that the user intended to load a marker with the identified characteristic. The confirmation may establish that the user actually looked at the user interface before performing any marking operation. In one implementation, the user may be unable to activate a trigger for dispensing a marker if the user does not confirm that the correct marker is loaded.

In another implementation, the marker characteristic(s) may be manually determined. For example, the user may specify the marker characteristic(s) via a user interface. The user interface may identify a number of possible characteristics (e.g., paint colors) of the marker. In this case, the user interface may request that that user select the paint color to be dispensed. The user interface may also identify the facility that corresponds to each of the possible paint colors so that the user can confirm that the correct marker is loaded.

Trigger activation may be received (block 530). For example, the user may effect trigger activation by applying pressure to mechanical trigger 264 with his/her hand. Alternatively, or additionally, the user may effect trigger activation by, for example, speaking a particular command to cause a trigger signal to be output by wireless/wired trigger 320. Alternatively, or additionally, the user may effect trigger activation by touching a particular area of display 266 to cause a trigger command to be output by display 266.

It may optionally be determined whether to permit trigger activation (block 540). For example, the user may be required to confirm that a marker with the correct marker characteristic is loaded before trigger activation may be permitted. Alternatively, marking tool 200 may be loaded with information from the user's ticket. In this case, trigger activation may be prevented when the marker characteristic of the marker does not match the ticket information. For example, if the ticket information indicates that the user is to dispense blue and yellow paint at a particular location, then activation of the trigger may be permitted if blue or yellow paint is loaded into marking tool 200, and activation of the trigger may be prevented otherwise.

If activation of the trigger is permitted, then a marker may be dispensed (block 550), and marking information may be stored (block 560). To dispense a marker (block 550), actuation device 288 may be activated to cause nozzle 290 of paint canister 284 to be depressed, which may cause paint from paint canister 284 to be expelled via nozzle 290.

To store marking information (block 560), a signal may be sent to processor 268. The signal may be sent from signal generator 310, wireless/wired trigger 320, and/or display 266, as described above. The signal may instruct processor 268 to store the marking information. For example, processor 268 may store the marking information in local memory 270. In this case, processor 268 may create an entry in local memory 270. Alternatively, or additionally, processor 268 may store the marking information by transmitting the marking information for storage by a device or system external to marking tool 200.

Further, while a series of blocks have been illustrated in FIG. 5, the order of the blocks may differ in other implementations. In addition, non-dependent blocks may be performed in parallel.

Figure 6A:
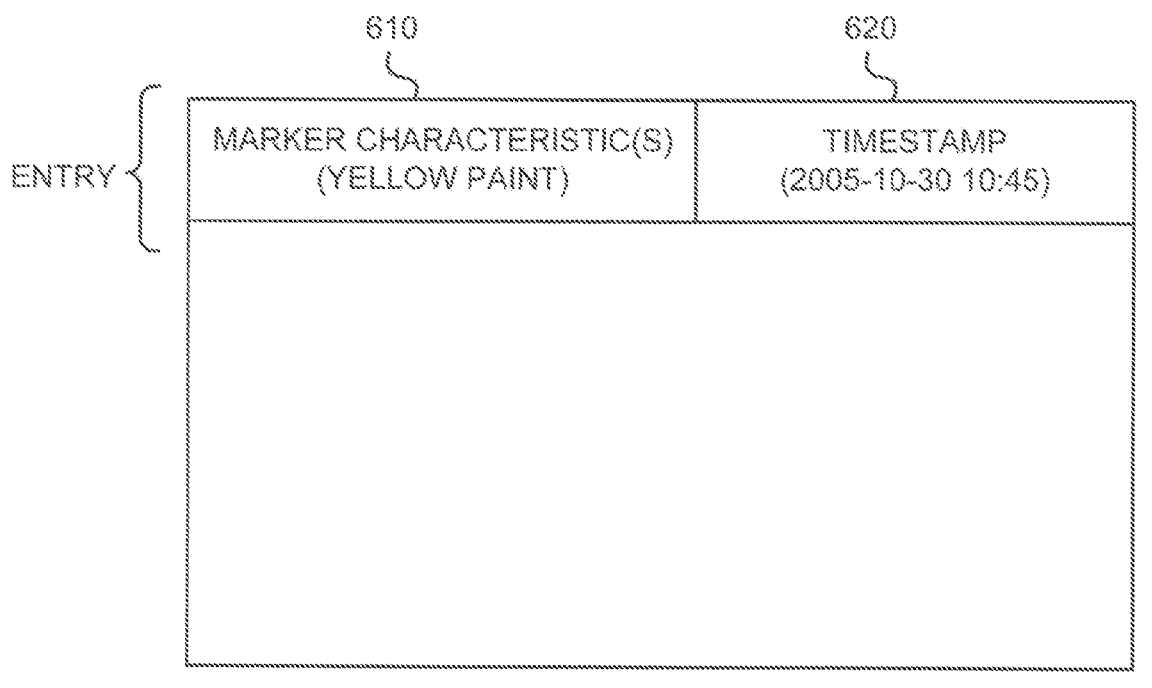

Turning to FIG. 6A, a diagram of an exemplary entry that may be viewed on display 266 is provided. As shown in FIG. 6A, an entry may include a marker characteristic(s) field 610 and a timestamp field 620. Marker characteristic(s) field 610 may include information regarding one or more marker characteristics, such as marker color, marker shape, or marker type. The information in marker characteristic(s) field 610 is shown in FIG. 6A as "yellow" or "yellow paint" although any type of descriptive information may be used. Timestamp field 620 may include time data that identifies the day and/or time that the marker was dispensed. The time data in timestamp field 620 is shown in FIG. 6A as 10:45 a.m. on Oct. 20, 2005, although any type of date and/or time code may be used. As explained above, the marking information may be useful to determine whether the user dispensed the correct marker(s) (e.g., the correct color paint) in a particular location. For example, the user's ticket may identify what facilities were to be marked in the area. The marking information may help insure that the job was completed correctly.

Figure 6B:
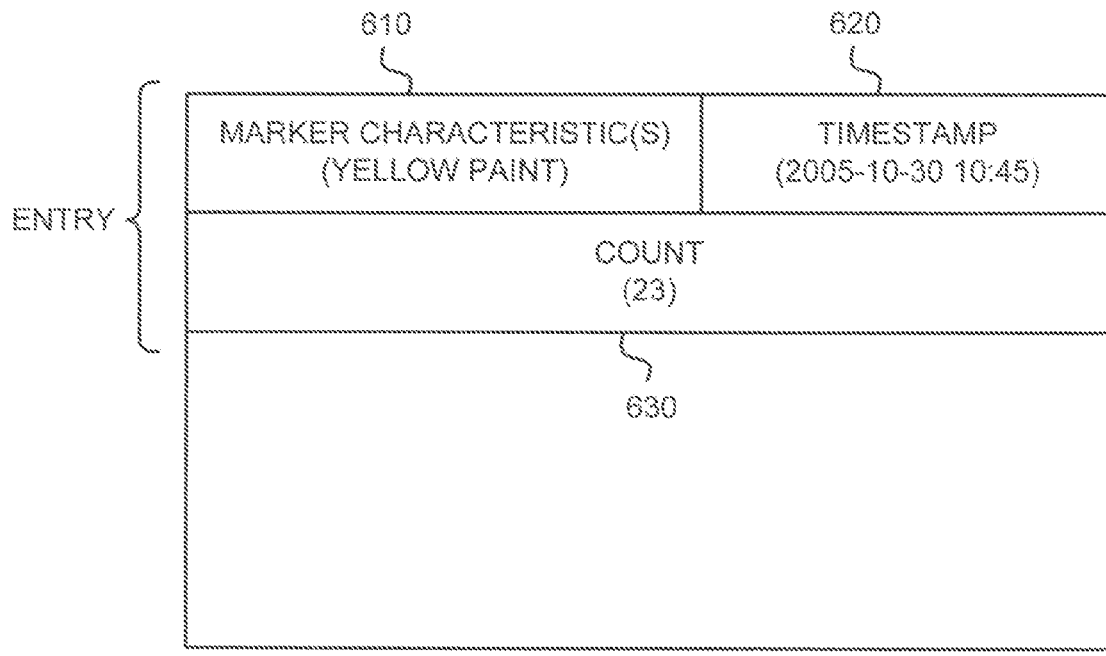

Referring now to FIG. 6B, a diagram of another exemplary entry that may be viewed on display 266 is shown. As shown in FIG. 6B, an entry may include a marker characteristic(s) field 610, a timestamp field 620, and a count field 630. Marker characteristic(s) field 610 and timestamp field 620 may be similar to the similarly named fields in FIG. 6A. Count field 630 may include information that identifies the number of times that the user activated the trigger to dispense a marker (e.g., yellow paint). The information in count field 630 is shown in FIG. 6B as twenty-three, although any count value can be used. The information in count field 630 may be useful to determine or estimate an amount of paint that was dispensed at the location and, thus, whether the amount of paint was reasonable given the job that was to be performed.

Figure 6C:
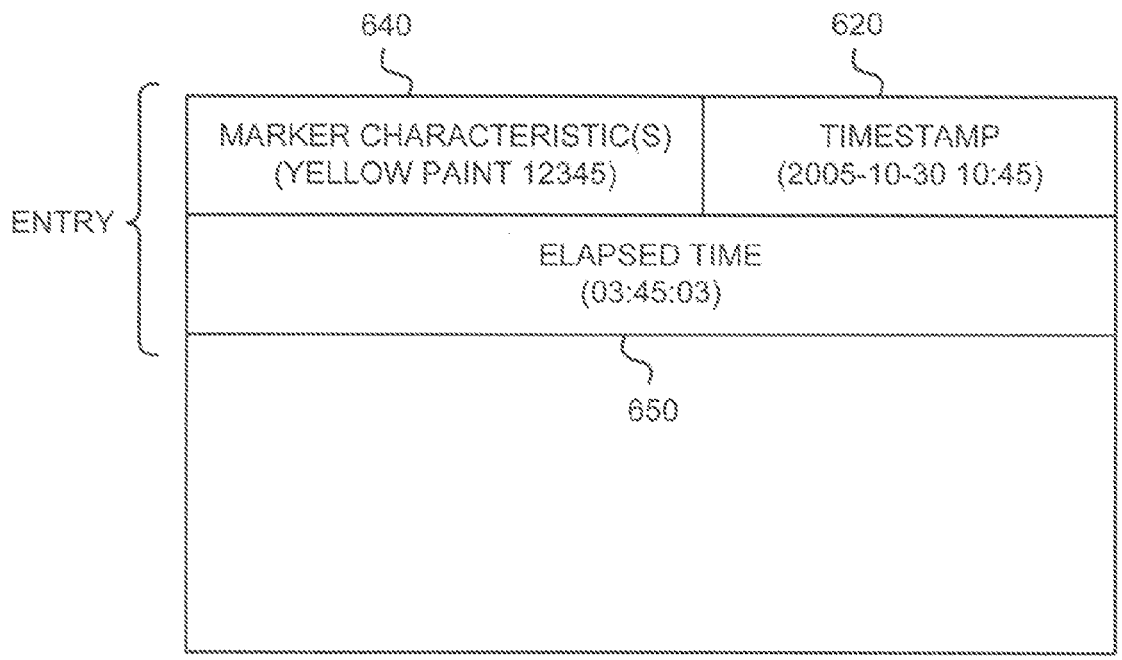

Turning to FIG. 6C, a diagram of another exemplary entry that may be viewed on display 266 is provided. As shown in FIG. 6C, an entry may include a marker characteristic(s) field 640, a timestamp field 620, and an elapsed time field 650. Marker characteristic(s) field 640 and timestamp field 620 may be similar to the similarly named fields in FIG. 6A. In this case, however, marker characteristic(s) field 640 may additionally store an identifier that identifies a particular marker (e.g., a particular canister of paint). The identifier is shown in FIG. 6C as "12345," although any type of identifier may be used.

Elapsed time field 650 may include information that identifies the amount of time that has elapsed from when the user activated the trigger for dispensing a marker (e.g., yellow paint) to when the user ceased activating the trigger. The information in elapsed time field 650 is shown in FIG. 6C as three minutes, forty-five seconds, and three one hundredths of a second, although any time code can be used. The information in elapsed time field 650 may be useful to determine or estimate when a supply of markers is nearly empty. The information in elapsed time field 650 may help determine when to replace the canister. The elapsed time or a signal indicating that a supply of markers needs to be replaced may be presented to the user visually and/or audibly. The information in elapsed time field 650 may also, or alternatively, be useful to determine or estimate an amount of markers used in a particular location.

While three exemplary entries have been described with regard to FIGS. 6A-6C, an entry may include more, fewer, different, or combinations of the fields shown in FIGS. 6A-6C.

The foregoing description is not intended to be exhaustive or to limit the description to the precise form disclosed. Modifications and variations are possible in light of the above disclosure or may be acquired from practice of the present disclosure.

For example, processors 140 and 268 can be general purpose computers. Alternatively, they can be special purpose computers, programmed microprocessors or microcontrollers and peripheral integrated circuit elements, ASICs or other integrated circuits, hardwired electronic or logic circuits such as discrete element circuits, programmable logic devices such as FPGA, PLD, PLA, or PAL or the like. In general, any device capable of executing code can be used to implement processors 140 and 268. Local memories 130 and 270 can be implemented with any type of electronic memory and/or storage device using any type of media, such as magnetic, optical or other media.

In addition, it has been described that information regarding an elapsed time may be used to determine or estimate when a supply of markers is nearly empty. In another implementation, a sensor may be used to detect a weight of a paint canister 284. The sensor may be placed on paint canister 284 or within paint canister holder 282. The weight of paint canister 284 may be used to estimate how full or empty paint canister 284 is. This information may be provided to an operator of marking tool 200 visually and/or audibly. In one implementation, replacing paint canister 284 may trigger the identification of the marker characteristic (e.g., paint color) by tag reader 246. This may help reduce the overall battery life of tag reader 246 and/or tag 286 by limiting the number of times that tag reader 246 is used (e.g., only obtain the marker characteristic when paint canister 284 is initially loaded into paint canister holder 282).

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects are described without reference to the specific software code, it being understood that software and control hardware can be designed to implement the aspects based on the description herein.

No element, act, or instruction used in the present application should be construed as critical or essential to the present disclosure unless explicitly described as such. In addition, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A marking tool, comprising:
an elongated housing including a handle;
a user activated triggering system coupled to the housing, the triggering system configured to cause dispensing of a marker in response to a user input
a marker dispenser coupled to the housing to hold and dispense the marker; and
a processor configured to determine at least one characteristic associated with dispensing the marker, the processor further configured to prevent activation of the triggering system in response to at least one of:
a determination by the processor that a marker characteristic fails to match a characteristic identified in a marking operation instruction; and
a failure to confirm that a correct marker, based on the marker characteristic, is loaded in the marker dispenser.

2. The marking tool of claim 1, wherein the at least one characteristic associated with dispensing the marker includes time data including any one or more of the following: when the marker was dispensed, a duration of time that the marker was dispensed, and when the marker was not dispensed.

3. The marking tool of claim 1, wherein the processor is further configured to determine the marker characteristic.

4. The marking tool of claim 3, wherein the marker characteristic includes a type of the marker or a color of the marker.

5. The marking tool of claim 1, wherein the processor is configured to determine the marker characteristic before the triggering system may dispense the marker or continue to dispense the marker.

6. A marking tool, comprising:
an elongated housing including a handle;
a user activated triggering system coupled to the housing, the triggering system configured to cause a dispense of a marker in response to a user input;
a marker dispenser coupled to the housing to hold and dispense the marker; and
a processor to determine at least one marker characteristic, the processor further configured to prevent activation of the triggering system in response to at least one of:
a determination by the processor that the at least one marker characteristic fails to match a characteristic identified in a marking operation instruction; and
a failure to confirm that a correct marker, based on the at least one marker characteristic, is loaded in the marker dispenser.

7. The marking tool of claim 6, wherein the marker includes a tag, the tag storing information associated with the at least one marker characteristic.

8. The marking tool of claim 7, wherein the tag is a radio frequency identification (RFID) tag and a tag reader is an RFID reader.

9. The marking tool of claim 7, wherein the tag is a barcode and a tag reader is a barcode reader.

10. The marking tool of claim 6, wherein the at least one marker characteristic includes a type of the marker or a color of the marker.

11. The marking tool of claim 6, wherein the processor further determines at least one characteristic associated with dispensing the marker.

12. The marking tool of claim 11, wherein the at least one characteristic associated with dispensing the marker includes time data including any one or more of the following: when the marker was dispensed, a duration of time that the marker was dispensed, and when the marker was not dispensed.

13. The marking tool of claim 6, wherein the processor is configured to identify a type of at least one underground facility to which the at least one marker characteristic corresponds.

14. The marking tool of claim 6, wherein the processor is configured to request user confirmation that the at least one marker characteristic is correct before the triggering system may actuate dispensing the marker.

15. A method for marking a presence or an absence of at least one underground facility, the method comprising:
dispensing a marker when a trigger of a marking tool is actuated and a processing device of the marking tool confirms that a correct marker is loaded in the marking tool based on a marker characteristic;
identifying at least one characteristic associated with dispensing the marker;
storing the at least one characteristic associated with dispensing the marker when the actuation of the trigger is signaled; and
storing the marker characteristic when the actuation of the trigger is signaled.

16. The method of claim 15, wherein the at least one characteristic associated with dispensing the marker includes time data including any one or more of the following: when the marker was dispensed, a duration of time that the marker was dispensed, and when the marker was not dispensed.

17. The method of claim 15, wherein the marker characteristic includes a type of the marker or a color of the marker.

18. The method of claim 15, further comprising the step of:
determining whether the marker may be dispensed or may continue to be dispensed based on the at least one characteristic associated with dispensing the marker.

19. The method of claim 18, wherein the step of determining is based on an association of the at least one characteristic associated with dispensing the marker with wage and hour rules and regulations.

20. The method of claim 15, wherein the step of identifying the at least one characteristic associated with dispensing the marker further includes the steps of:
presenting a plurality of characteristics associated with dispensing the marker on a user interface; and
selecting at least one of the plurality of characteristics as the at least one characteristic associated with dispensing the marker.

21. A method for marking a presence or an absence of at least one underground facility, the method comprising:
identifying, via a component of a marking tool, at least one characteristic of a marker loaded into the marking tool before the marking tool is actuatable to dispense the marker in response to a user activated input;
dispensing the marker when a trigger of the marking tool is actuated; and
causing storage, on a storage device, of the at least one marker characteristic of the marker loaded into the marking tool when the actuation of the trigger is signaled.

22. The method of claim 21, wherein a tag is associated with the marker, the tag storing at least one marker characteristic.

23. The method of claim 21, wherein the step of identifying the at least one marker characteristic includes reading the marker characteristic from a tag.

24. The method of claim 23, wherein the tag is a radio frequency identification (RFID) tag.

25. The method of claim 23, wherein the tag is a barcode tag.

26. The method of claim 21, wherein the at least one characteristic of the marker loaded into the marking tool includes a type of the marker or a color of the marker.

27. The method of claim 21, wherein the step of identifying the at least one characteristic of the marker loaded into the marking tool further includes the steps of:
presenting a plurality of marker characteristics on a user interface; and
selecting at least one of the plurality of marker characteristics as the characteristic of the marker loaded into the marking tool.

28. The method of claim 21, further comprising the step of:
determining whether to permit the trigger to be actuated based on the at least one marker characteristic of the marker loaded into the marking tool.

29. The method of claim 28, wherein the step of determining is based on an association of the marker characteristic of the marker loaded into the marking tool with information associated with a ticket.

30. The method of claim 28, wherein the step of determining is based on a confirmation that the marker characteristic is correct.

31. The method of claim 21, further comprising the step of:
determining at least one characteristic associated with dispensing the marker.

32. The method of claim 31, wherein the at least one characteristic associated with dispensing the marker includes time data including any one or more of the following: when the marker was dispensed, a duration of time that the marker was dispensed, and when the marker was not dispensed.

33. The marking tool of claim 1, wherein the marking operation instruction is provided on a ticket.

34. The marking tool of claim 6, wherein the marking operation instruction is provided on a ticket.

* * * * *

UNITED STATES PATENT AND TRADEMARK OFFICE
CERTIFICATE OF CORRECTION

PATENT NO. : 8,386,178 B2
APPLICATION NO. : 12/236688
DATED : February 26, 2013
INVENTOR(S) : Steven Nielsen et al.

Page 1 of 1

It is certified that error appears in the above-identified patent and that said Letters Patent is hereby corrected as shown below:

In the Claims

Please replace column 14, line 10 with the following corrected version:
-- [[marker]] characteristic of the marker loaded into the --

Please replace column 14, line 40 with the following corrected version:
-- ing is based on an association of the [[marker]] characteristic of --

Signed and Sealed this
Twenty-eighth Day of May, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,386,178 B2 | Page 1 of 1 |
| APPLICATION NO. | : 12/236688 | |
| DATED | : February 26, 2013 | |
| INVENTOR(S) | : Nielson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this
Eighteenth Day of November, 2014

Michelle K. Lee
*Deputy Director of the United States Patent and Trademark Office*